Sept. 16, 1952  W. A. BEDFORD, JR  2,610,377
FASTENER DEVICE
Filed Nov. 20, 1947
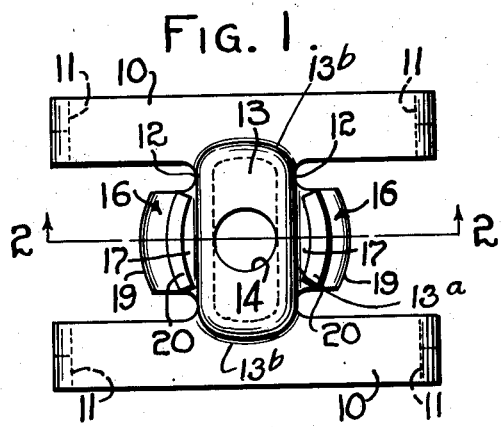
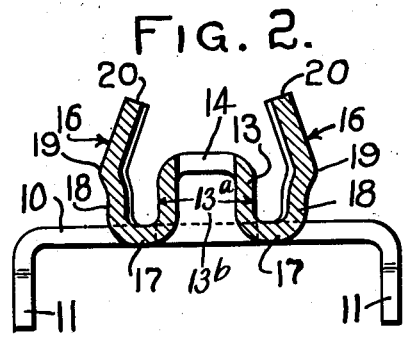
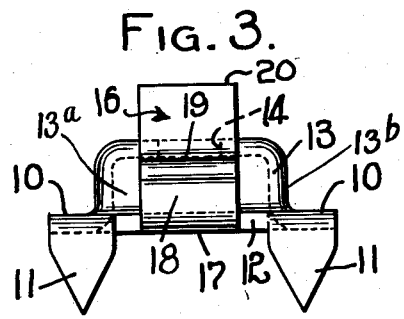
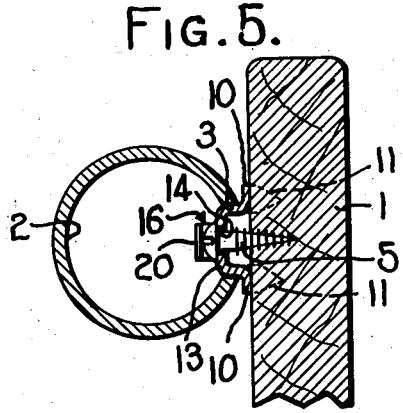
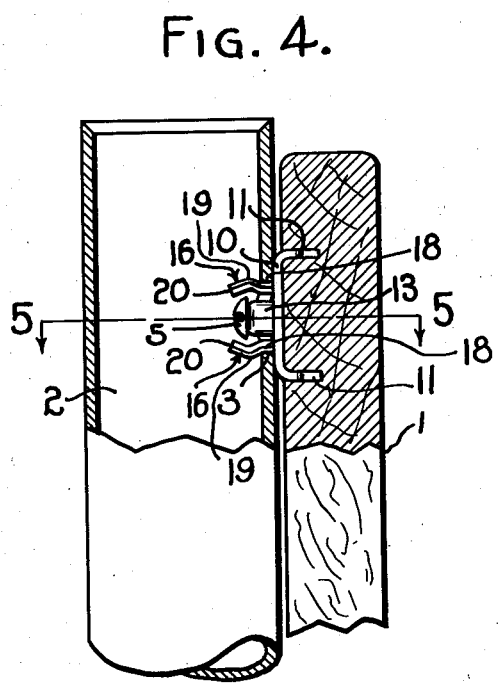
INVENTOR.
WILLIAM A. BEDFORD JR.
BY Philip E. Parker
ATTORNEY.

Patented Sept. 16, 1952

2,610,377

UNITED STATES PATENT OFFICE 2,610,377

FASTENER DEVICE

William A. Bedford, Jr., North Scituate, Mass., assignor to United-Carr Fastener Corporation, Cambridge, Mass., a corporation of Massachusetts Application November 20, 1947, Serial No. 787,227

7 Claims. (Cl. 24—213)

The present invention relates to fasteners adapted for attachment to a supported part and for releasable snap fastener attachment to an apertured support.

More particularly, the invention relates to fasteners for attaching a supported part, for example, a wood chair seat or back part to an apertured frame member, for example, a tubular metal tube of a furniture frame, and the invention aims generally to improve existing fasteners of the type.

A primary object of the invention is the provision of a fastener member of the type above referred to of a simple one-piece construction and possessing great strength in resistance to shear forces.

Other aims and advantages of the invention will be apparent to persons skilled in the art from a consideration of the accompanying drawings and annexed specification illustrating and describing a preferred construction embodying the invention.

In the drawings—

Fig. 1 is a plan view of a preferred construction of fastener embodying the invention;

Fig. 2 is a vertical sectional view of the fastener as taken on the line 2—2 of Fig. 1;

Fig. 3 is an elevation of the fastener as viewed from the right hand side of Figs. 1 and 2;

Fig. 4 is a vertical sectional view through one typical installation in which the fastener may be used; and Fig. 5 is an enlarged transverse sectional view thereof as taken on the line 5—5 of Fig. 4.

Referring to the drawings, the fastener is preferably formed from a single blank of metal shaped to provide a supported part-engaging member adapted to be connected to a part to be supported, and an integral continuous wall boss portion having associated therewith resilient snap fastener elements and forming a stud adapted to be inserted in and secured to an apertured support.

Advantageously, the supported-part-engaging member may comprise a base portion of general H-shape, having spaced opposed strap portions 10, each provided with means for attaching the fastening to a part 1 to be supported. When such part 1 is of wood or like fibrous material, the attaching means may conveniently be pronged terminals 11 extending angularly from opposite end portions of the straps 10. However, it will be clearly understood that other attaching means and elements may be employed for connecting the straps 10 or other portions of the base to the part 1 to be supported, particularly cases where such part is made of material other than wood.

The spaced straps 10 of the supported part are integrally joined by a bridge portion 12 having an elongated continuous walled boss 13 drawn therefrom and extending above and normal to the plane of the straps 10. The side and end walls 13$^a$ and 13$^b$, respectively, of the boss are continuously joined to the bridge and base, and the end wall portions 13$^b$ provide rigid support apertures-engaging portions. The boss 13 is of relatively greater length than width and is insertable in a circular aperture 3 of a support 2 as will be later explained. The boss preferably is provided with one or more apertures 14 in its upper or crown surface for the reception of screws or like fastenings 5 for increasing the security of the attachment of the fastener to the supported part 1.

The fastener is also provided with a plurality of resilient fastener prongs or clips 16 disposed between the straps 10 and normal to the major axis of the boss, and extending outwardly from the bridge portion 12. These prongs 16 are strips of a width less than the length of the boss and are connected to the side walls 13$^a$ of the boss by U-shaped bight or hinged portion 17 providing resiliency for the clips. The inner ends of the prongs 16, adjacent the bight portions 17, provide support aperture wall-engaging sections 18. The prongs are bulged outwardly, as at 19, and terminate in converging ends 20 to provide a yieldable snap fastener means for snap fastening engagement with an apertured support.

The end walls 13$^b$ of the boss 13, as well as the prong wings 16, are preferably curved to the radius of the support aperture, and the distance between sections 18—18 of opposed prongs 16—16 is equal to the length of the boss 13 as well as to the diameter of the aperture 3 in the support 2 in which the fastener is to be inserted, so as to engage the walls of the support aperture when the stud part is inserted therein.

The boss 13 and the wings 16 thus constitute a stud part for the fastener, a portion of which is resilient for snap fastener engagement with the aperture wall of the support, and another portion of which is rigid for increased resistance to shear forces that may be imposed upon the fastener. These regions of resilient and rigid contact are disposed on axes intersecting and normal to each other providing a strong compact fastener.

Fasteners of the present invention are adapted to a large variety of uses. Illustrative of a typical use, they may be employed to connect a wooden member 1 to a metal frame or support 2, as shown in Figs. 4 and 5. In these illustrations the support 2 may be a hollow metal tube such as a tubular metal chair frame having a circular aperture 3 therein and to which a wooden back or seat member 1 is to be secured.

The fastener is suitably secured to a surface of the part 1 with the base or straps 10 in flush engagement with a surface of the part 1. In the illustrated form this is effected by the penetration of the pointed prongs into the part 1, but any other suitable means may be used. Additionally, a screw 5 is passed through the boss opening 14 and into the part 1 as shown in Figs. 4 and 5.

The part 1 with the fastener securely attached to a face thereof is ready for attachment to the support 2. This is effected by simply inserting the stud part of the fastener in the support aperture 3. The rounded end walls of the continuous boss 13 are designed to engage the support aperture wall with a snug fit at opposite points on one diameter of said aperture 3 and the resilient fingers 16 engage and grip the aperture wall at opposite points on another diameter. It will be understood that the fingers 16 will yield inwardly to permit the bulged portions 19 to pass the wall of aperture 3 so that the wall will be gripped by the opposed sections 18—18.

The fastener is exceedingly strong and resistant to shear forces between the base and the stud portion, the latter including a continuous walled boss having continuous connection with the bridge portion 12 and the work-supporting base or straps 10.

Although I have illustrated and described a preferred construction embodying the invention, I do not intend to be limited thereto as the scope of the invention is best defined in the appended claims.

I claim:

1. A fastener for securing a part to be supported to an apertured support comprising a part-engaging member having a base portion, and an integral support-engaging stud member extending normal to the base portion and within the marginal edges thereof and including a continuous walled elongated boss providing opposed rigid support-aperture-engaging wall portions at the ends thereof adjacent said base portion, and resilient snap fastener fingers integrally connected to the side walls of said boss intermediate the opposed rigid support-aperture-engaging wall portions thereof and lying entirely outwardly of the side wall portions of said boss, said fingers having a support-aperture-engaging wall portion adjacent said base and in the plane of the support-aperture-engaging wall portions of the boss and outwardly bulging and converging end portions for snap fastener engagement with the apertured support.

2. A fastener for securing a part to be supported to an apertured support comprising a part-engaging member having a base portion, and an integral support-engaging stud member extending normal to the base portion and within the marginal edges thereof and including a continuous-walled elongated dome-shaped boss providing opposed rigid support-aperture-engaging wall portions at the ends thereof adjacent said base portion and resilient snap fastener fingers integrally connected to the side walls of said boss intermediate the opposed rigid support-aperture-engaging wall portions thereof and lying entirely outwardly of the side wall portions of said boss, said fingers having a support-aperture-engaging wall portion adjacent said base and in the plane of the support-aperture-engaging wall portions of the boss, and outwardly bulging and converging end portions for snap fastener engagement with the apertured support.

3. A fastener for securing a part to be supported to an apertured support comprising a part-engaging member having a base portion, and an integral support-engaging stud member extending normal to the base portion and within the marginal edges thereof and including a continuous-walled elongated dome-shaped boss providing opposed rigid support-aperture-engaging wall portions at the ends thereof adjacent said base portion and resilient snap fastener fingers integrally connected to the side walls of said boss intermediate the opposed rigid support-aperture-engaging wall portions thereof and lying entirely outwardly of the side wall portions of said boss, said fingers having a support-aperture-engaging wall portion adjacent said base and in the plane of the support-aperture-engaging wall portions of the boss and outwardly bulging and converging end portions for snap fastener engagement with the apertured support, said dome-shaped boss being apertured for the reception of fastening means to secure said fastener to a part to be supported.

4. A fastener for securing a part to be supported to an apertured support comprising a part-engaging member having a substantially H-shaped base presenting spaced bearing portions for attachment to a part to be supported, an elongated continuous walled boss formed integrally with said base and bridging the spaced bearing portions of said base, the continuous wall of said boss providing opposed rigid support-aperture-engaging wall portions at the ends of the major axis of the boss, and resilient fingers integrally joined to the wall of the boss and extending therefrom in the direction of the minor axis thereof and providing opposed resilient snap fastener members for engagement with a support apertured wall.

5. A fastener for securing a part to be supported to an apertured support comprising a part-engaging member having a substantially H-shaped base presenting spaced bearing portions for attachment to a part to be supported, an elongated continuous walled boss formed integrally with said base and bridging the spaced bearing portions of said base, the continuous end wall of said boss providing opposed rigid support-aperture-engaging wall portions at the ends of the major axis of the boss, and integral resilient fingers extending from opposite sides of said boss in the direction of the minor axis thereof, said fingers providing support-aperture-engaging wall portions connected to the boss wall by an arcuate bight portion disposed substantially in the plane of the base.

6. A fastener for securing a part to be supported to an apertured support comprising a part-engaging member having a substantially H-shaped base presenting spaced bearing portions for attachment to a part to be supported, an elongated continuous walled boss formed integrally with said base and bridging the spaced bearing portions of said base, the continuous end wall of said boss providing opposed rigid support-aperture-engaging wall portions at the ends of the major axis of the boss, and integral resilient fingers extending from opposite sides of said boss in the direction of the minor axis thereof, said fingers providing support-aperture-engaging wall portions spaced from the side walls of said boss and connected thereto by an arcuate bight portion disposed substantially in the plane of the base.

7. A fastener for securing a part to be supported to an apertured support comprising a part-engaging member having a substantially H-shaped base presenting spaced bearing portions for attachment to a part to be supported, an elongated boss having continuous side and end walls integrally joined to and extending in a direction normal to said base and bridging the spaced bearing portions of said base, a top wall continuously and integrally joined to said end and side walls, said top wall being apertured to receive fastener means to secure said fastener to a part to be supported, the continuous end wall of said boss providing opposed rigid support-aperture-engaging wall portions at the ends of the major axis of the boss, and integral resilient fingers extending from opposite sides of said boss in the direction of the minor axis thereof, said fingers providing support-aperture-engaging wall portions connected to the boss wall by an arcuate bight portion disposed substantially in the plane of the base.

WILLIAM A. BEDFORD, JR.

REFERENCES CITED

The following references are of record in the file of this patent:

UNITED STATES PATENTS

| Number | Name | Date |
| --- | --- | --- |
| 252,311 | Goulding | Jan. 17, 1882 |
| 1,335,368 | Cramp | Mar. 30, 1920 |
| 1,538,320 | Gullong | May 19, 1925 |
| 2,048,659 | Jones | July 21, 1936 |
| 2,065,325 | Calhoun | Dec. 22, 1936 |
| 2,144,171 | Van Uum | Jan. 17, 1939 |
| 2,227,761 | Roethel | Jan. 7, 1941 |
| 2,303,148 | Tinnerman | Nov. 24, 1942 |